(12) United States Patent
Gower et al.

(10) Patent No.: US 8,769,335 B2
(45) Date of Patent: *Jul. 1, 2014

(54) HOMOGENEOUS RECOVERY IN A REDUNDANT MEMORY SYSTEM

(71) Applicant: International Business Machines Corporation, Armonk, NY (US)

(72) Inventors: Kevin C. Gower, LaGrangeville, NY (US); Luis A. Lastras-Montano, Cortlandt Manor, NY (US); Patrick J. Meaney, Poughkeepsie, NY (US); Vesselina K. Papazova, Highland, NY (US); Eldee Stephens, Waterbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/792,933

(22) Filed: Mar. 11, 2013

(65) Prior Publication Data

US 2013/0191682 A1 Jul. 25, 2013

(51) Int. Cl.
  G06F 11/00 (2006.01)
(52) U.S. Cl.
  USPC .................................. 714/2; 714/4.1; 714/4.5
(58) Field of Classification Search
  USPC .................................. 714/2, 6.1, 16, 4.1, 4.5
  See application file for complete search history.

(56) References Cited

U.S. PATENT DOCUMENTS

| 4,464,747 A | 8/1984 | Groudan et al. |
| 4,817,091 A | 3/1989 | Katzman et al. |
| 4,996,687 A | 2/1991 | Hess et al. |
| 5,124,948 A | 6/1992 | Takizawa et al. |
| 5,163,023 A | 11/1992 | Ferris et al. |
| 5,272,671 A | 12/1993 | Kudo |
| 5,463,643 A * | 10/1995 | Gaskins et al. ............... 714/766 |
| 5,488,691 A | 1/1996 | Fuoco |
| 5,499,253 A | 3/1996 | Lary |
| 5,513,135 A | 4/1996 | Dell et al. |

(Continued)

FOREIGN PATENT DOCUMENTS

| JP | 11144491 A2 | 5/1999 |
| WO | 2006029243 A1 | 3/2006 |

OTHER PUBLICATIONS

Chen, P. M., et al.; "RAID: High Performance, Reliable Secondary Storage"; ACM Computing Surveys; ACM, New York, NY, US vol. 26, No. 2, Jun. 1, 1994, pp. 145-185.

(Continued)

*Primary Examiner* — Loan L.T. Truong
(74) *Attorney, Agent, or Firm* — Cantor Colburn LLP; Margaret McNamara

(57) ABSTRACT

A computer implemented method for providing homogeneous recovery in a redundant memory system. The method includes receiving a notification that a memory channel has failed, where the memory channel is one of a plurality of memory channels in a memory system. New operations are blocked from starting on the memory channels in response to the notification, and any pending operations on the memory channels are completed in response to the notification. A recovery operation is performed on the memory channels in response to the completing. The new operations are started on at least a first subset of the memory channels in response to the recovery operation completing. The memory system is configured to operate with the first subset of the memory channels.

6 Claims, 9 Drawing Sheets

US 8,769,335 B2
Page 2

(56) References Cited

U.S. PATENT DOCUMENTS

| | | | |
|---|---|---|---|
| 5,537,665 A | 7/1996 | Patel et al. | |
| 5,574,945 A | 11/1996 | Elko et al. | |
| 5,655,076 A * | 8/1997 | Kimura et al. | 714/56 |
| 5,680,564 A | 10/1997 | Divivier | |
| 5,684,810 A | 11/1997 | Nakamura et al. | |
| 6,012,839 A | 1/2000 | Nguyen | |
| 6,125,469 A | 9/2000 | Zook et al. | |
| 6,131,178 A | 10/2000 | Fujita et al. | |
| 6,282,701 B1 | 8/2001 | Wygodny et al. | |
| 6,332,206 B1 | 12/2001 | Nakatsuji et al. | |
| 6,381,685 B2 | 4/2002 | Dell et al. | |
| 6,418,068 B1 | 7/2002 | Raynham | |
| 6,442,726 B1 | 8/2002 | Knefel | |
| 6,618,775 B1 | 9/2003 | Davis | |
| 6,715,116 B2 | 3/2004 | Lester et al. | |
| 6,763,444 B2 | 7/2004 | Thomann | |
| 6,820,072 B1 | 11/2004 | Skaanning et al. | |
| 6,845,472 B2 | 1/2005 | Walker | |
| 6,854,070 B2 | 2/2005 | Johnson et al. | |
| 6,973,612 B1 | 12/2005 | Rodi | |
| 6,976,194 B2 | 12/2005 | Cypher | |
| 6,981,205 B2 | 12/2005 | Fukushima et al. | |
| 6,988,219 B2 | 1/2006 | Hitz et al. | |
| 7,055,054 B2 | 5/2006 | Olarig | |
| 7,099,994 B2 | 8/2006 | Thayer et al. | |
| 7,149,269 B2 | 12/2006 | Cranford, Jr. et al. | |
| 7,149,945 B2 | 12/2006 | Brueggen | |
| 7,191,257 B2 | 3/2007 | Ali Khan et al. | |
| 7,200,780 B2 | 4/2007 | Kushida | |
| 7,243,291 B1 * | 7/2007 | Williams | 714/776 |
| 7,278,086 B2 | 10/2007 | Banks et al. | |
| 7,313,749 B2 | 12/2007 | Nerl et al. | |
| 7,320,086 B2 | 1/2008 | Majni et al. | |
| 7,353,316 B2 | 4/2008 | Erdmann | |
| 7,409,581 B2 | 8/2008 | Santeler et al. | |
| 7,467,126 B2 | 12/2008 | Smith et al. | |
| 7,484,138 B2 | 1/2009 | Hsieh et al. | |
| 7,752,490 B2 | 7/2010 | Abe | |
| 7,774,638 B1 * | 8/2010 | Cavanagh et al. | 714/4.2 |
| 7,962,803 B2 | 6/2011 | Huber et al. | |
| 8,041,990 B2 | 10/2011 | O'Connor et al. | |
| 8,046,628 B2 | 10/2011 | Resnick | |
| 8,103,900 B2 | 1/2012 | Fry et al. | |
| 8,484,529 B2 * | 7/2013 | Alves et al. | 714/758 |
| 8,510,592 B1 * | 8/2013 | Chan | 714/5.1 |
| 8,522,122 B2 | 8/2013 | Alves et al. | |
| 8,549,378 B2 * | 10/2013 | Alves et al. | 714/763 |
| 8,631,271 B2 * | 1/2014 | Gower et al. | 714/6.1 |
| 2002/0066052 A1 | 5/2002 | Olarig et al. | |
| 2002/0181633 A1 | 12/2002 | Trans | |
| 2002/0199172 A1 | 12/2002 | Bunnell | |
| 2003/0002358 A1 | 1/2003 | Lee et al. | |
| 2003/0023930 A1 | 1/2003 | Fujiwara et al. | |
| 2003/0208704 A1 | 11/2003 | Bartels et al. | |
| 2004/0034818 A1 | 2/2004 | Gross et al. | |
| 2004/0093472 A1 * | 5/2004 | Dahlen et al. | 711/158 |
| 2004/0123223 A1 | 6/2004 | Halford | |
| 2004/0168101 A1 | 8/2004 | Kubo | |
| 2004/0227946 A1 | 11/2004 | Li et al. | |
| 2005/0060521 A1 | 3/2005 | Wang | |
| 2005/0108594 A1 | 5/2005 | Menon et al. | |
| 2005/0204264 A1 | 9/2005 | Yusa | |
| 2005/0283641 A1 * | 12/2005 | Clark et al. | 714/4 |
| 2006/0067449 A1 | 3/2006 | Boehl et al. | |
| 2006/0146318 A1 | 7/2006 | Adam et al. | |
| 2006/0156190 A1 | 7/2006 | Finkelstein et al. | |
| 2006/0244827 A1 | 11/2006 | Moya et al. | |
| 2006/0248406 A1 | 11/2006 | Qing et al. | |
| 2006/0251416 A1 | 11/2006 | Letner et al. | |
| 2006/0282745 A1 | 12/2006 | Joseph et al. | |
| 2007/0011562 A1 | 1/2007 | Alexander et al. | |
| 2007/0033195 A1 | 2/2007 | Stange et al. | |
| 2007/0047344 A1 | 3/2007 | Thayer et al. | |
| 2007/0047436 A1 | 3/2007 | Arai et al. | |
| 2007/0050688 A1 | 3/2007 | Thayer | |
| 2007/0089035 A1 | 4/2007 | Alexander et al. | |
| 2007/0101094 A1 | 5/2007 | Thayer et al. | |
| 2007/0150792 A1 | 6/2007 | Ruckerbauer | |
| 2007/0168730 A1 | 7/2007 | Memmi | |
| 2007/0192667 A1 | 8/2007 | Nieto et al. | |
| 2007/0201595 A1 | 8/2007 | Stimple et al. | |
| 2007/0217559 A1 | 9/2007 | Stott et al. | |
| 2007/0226544 A1 | 9/2007 | Woodhouse | |
| 2007/0239379 A1 | 10/2007 | Newcomb et al. | |
| 2007/0260623 A1 | 11/2007 | Jaquette et al. | |
| 2007/0266275 A1 | 11/2007 | Stimple et al. | |
| 2007/0286199 A1 | 12/2007 | Coteus et al. | |
| 2008/0005644 A1 | 1/2008 | Dell | |
| 2008/0010435 A1 | 1/2008 | Smith et al. | |
| 2008/0046792 A1 | 2/2008 | Yamamoto et al. | |
| 2008/0046796 A1 | 2/2008 | Dell et al. | |
| 2008/0056415 A1 | 3/2008 | Chang et al. | |
| 2008/0126828 A1 | 5/2008 | Girouard et al. | |
| 2008/0130816 A1 | 6/2008 | Martin et al. | |
| 2008/0163385 A1 | 7/2008 | Mahmoud | |
| 2008/0168329 A1 | 7/2008 | Han et al. | |
| 2008/0184077 A1 * | 7/2008 | Kuttan et al. | 714/48 |
| 2008/0216054 A1 | 9/2008 | Bates et al. | |
| 2008/0222449 A1 | 9/2008 | Ramgarajan et al. | |
| 2008/0250270 A1 | 10/2008 | Bennett | |
| 2008/0266999 A1 | 10/2008 | Thayer | |
| 2008/0285449 A1 | 11/2008 | Larsson et al. | |
| 2008/0313241 A1 | 12/2008 | Li et al. | |
| 2009/0006886 A1 | 1/2009 | O'Connor et al. | |
| 2009/0006900 A1 * | 1/2009 | Lastras-Montano et al. | 714/42 |
| 2009/0024902 A1 | 1/2009 | Jo et al. | |
| 2009/0049365 A1 | 2/2009 | Kim et al. | |
| 2009/0052600 A1 | 2/2009 | Chen et al. | |
| 2009/0106491 A1 | 4/2009 | Piszczek et al. | |
| 2009/0164715 A1 | 6/2009 | Astigarraga et al. | |
| 2009/0177457 A1 | 7/2009 | Dai et al. | |
| 2009/0193315 A1 * | 7/2009 | Gower et al. | 714/758 |
| 2009/0228648 A1 | 9/2009 | Wack | |
| 2009/0287890 A1 | 11/2009 | Bolosky | |
| 2009/0292960 A1 | 11/2009 | Haraden et al. | |
| 2010/0005281 A1 | 1/2010 | Buchmann et al. | |
| 2010/0005345 A1 | 1/2010 | Ferraiolo et al. | |
| 2010/0082066 A1 | 4/2010 | Sivaramakrishnam et al. | |
| 2010/0107148 A1 | 4/2010 | Decker et al. | |
| 2010/0162033 A1 * | 6/2010 | Ahn et al. | 714/4 |
| 2010/0182056 A1 | 7/2010 | Liang et al. | |
| 2010/0205367 A1 | 8/2010 | Ehrlich et al. | |
| 2010/0217915 A1 | 8/2010 | O'Connor et al. | |
| 2010/0218051 A1 | 8/2010 | Walker et al. | |
| 2010/0220828 A1 | 9/2010 | Fuller et al. | |
| 2010/0241899 A1 | 9/2010 | Mayer et al. | |
| 2010/0269021 A1 | 10/2010 | Gower et al. | |
| 2010/0293532 A1 | 11/2010 | Andrade et al. | |
| 2010/0306489 A1 | 12/2010 | Abts et al. | |
| 2010/0306574 A1 | 12/2010 | Suzuki et al. | |
| 2010/0332909 A1 | 12/2010 | Larson | |
| 2011/0051854 A1 | 3/2011 | Kizer et al. | |
| 2011/0075782 A1 | 3/2011 | Zhang et al. | |
| 2011/0078496 A1 | 3/2011 | Jeddeloh | |
| 2011/0126079 A1 | 5/2011 | Wu et al. | |
| 2011/0173162 A1 | 7/2011 | Anderson et al. | |
| 2011/0320864 A1 | 12/2011 | Gower et al. | |
| 2011/0320869 A1 | 12/2011 | Gower et al. | |
| 2011/0320881 A1 | 12/2011 | Dodson et al. | |
| 2011/0320914 A1 | 12/2011 | Alves et al. | |
| 2012/0233500 A1 | 9/2012 | Roettgermann et al. | |

OTHER PUBLICATIONS

D. Wortzman; "Two-Tier Error Correcting Code for Memories"; vol. 26, #10, pp. 5314-5318; Mar. 1984.
EP Application No. 08760760.2 Examination Report dated Jun. 10, 2010, 7 pages.
EP Application No. 08760760.2 Examination Report dated Jul. 23, 2012, 7 pages.
International Search Report and Written Opinion for PCT/EP2008/057199 dated Mar. 23, 2009, 10 pages.
International Search Report and Written Opinion for PCT/EP2011/058924 dated Nov. 9, 2011, 9 pages.

(56) References Cited

OTHER PUBLICATIONS

L.A. Lastras-Montano; "A new class of array codes for memory storage"; Version—Jan. 19, 2011, 9 pages.

System Z GF (65536) x8 RAIM Code—Mar. 12, 2010, pp. 1-22.

The RAIDBook—A Source for RAID Technology by the RAID Advisory Board, Lino Lakes, MN, Jun. 9, 1993; XP002928115; pp. 1-113.

U.S. Appl. No. 13/793,363, filed Mar. 11, 2013; Non-Final Office Action mail date Jun. 20, 2013.

* cited by examiner

|  | Tier1 Start | Tier2 Start | Tier3 Start |
|---|---|---|---|
| FWD Progress Window Active | FWD Progr Tier 1 Count<Mask AND INTF Mon Tier 1 Count<Mask | (FWD Progr Tier 1 Count>==Mask OR INTF Mon Tier 1 Count>==Mask) AND FWD Progr Tier 2 Count<Mask AND INTF Mon Tier 2 Count<Mask | (FWD Progr Tier 1 Count>==Mask OR INTF Mon Tier 1 Count>==Mask) AND (FWD Progr Tier 2 Count>==Mask OR INTF Mon Tier 2 Count>==Mask) AND FWD Progr Tier 3 Count<Mask INTF Mon Tier 3 Count<Mask |
| FWD Progress Window Inactive | INTF Mon Tier 1 Count<Mask | INTF Mon Tier 1 Count>==Mask AND INTF Mon Tier 2 Count<Mask | INTF Mon Tier 1 Count>==Mask AND INTF Mon Tier 2 Count>==Mask AND INTF Mon Tier 3 Count<Mask |

*FIG. 8*

HOMOGENEOUS RECOVERY IN A REDUNDANT MEMORY SYSTEM

CROSS-REFERENCE TO RELATED APPLICATION

This application is a continuation of U.S. patent application Ser. No. 12/822,964, filed Jun. 24, 2010, the content of which is hereby incorporated by reference in its entirety.

BACKGROUND

This invention relates generally to computer memory and more particularly, to homogeneous recovery in a redundant memory system.

Redundant array of independent memory (RAIM) systems have been developed to improve performance and/or to increase the availability of storage systems. RAIM distributes data across several independent memory channels (e.g., made up of memory modules each containing one or more memory devices). There are many different RAIM schemes that have been developed each having different characteristics, and different pros and cons associated with them. Performance, availability, and utilization/efficiency (the percentage of the disks that actually hold customer data) are perhaps the most important. The tradeoffs associated with various schemes have to be carefully considered because improvements in one attribute can often result in reductions in another.

With the movement in high speed memory systems towards the use of differential drivers, the number of logical bus wires has been effectively cut in half. This makes the use of error correction code (ECC) protection across multiple channels of a memory more expensive as the use of ECC causes an either further reduction in the number of bits of data that are transferred in each packet or frame across the channel. An alternative is the use of CRC on channel busses to detect errors. However, since CRC is detectable but not correctable at the bus-level, soft or hard errors detected on the busses require a retry of the failing operations at the bus level. Typically, this means retrying fetches and retrying stores to memory.

For stores, the buffers containing the store data merely have to hold the data until it is certain that the data has been stored. The store commands and data can be resent to the memory interface.

For fetches, the line of data can merely be refetched from memory. However, consideration has to be given to the various recovery scenarios. For instance, if a double line of data (e.g., 256 bytes) is required from memory but ECC is only across a quarter of a line (e.g., 64 bytes), consideration must be given to the error scenarios. If the error occurs on the first 64 bytes, the data can be refetched and the entire 256 byte line can be delayed by the recovery time. However, if there is no error until the third quarter line is fetched, a decision has to be made about how to handle the first half of the line. For latency reasons, it may be advantageous to send the quarter lines as they are fetched. However, this means that any error on a quarter line will cause a gap while waiting for that quarter line. If the hardware does not have separate address/protocol tags for each quarter line, then there will be gaps on the fetch data, and the system may not be designed to handle gaps on the fetch data. One approach to avoid the gaps is delay the entire line until all the ECC is clean. A drawback to this approach is that it would cause undue latency on the line that would have to be incurred on all lines, not just those with errors.

Accordingly, and while existing techniques for dealing with recovery in a memory system may be suitable for their intended purpose, there remains a need in the art for error recovery schemes in a memory system that overcome this drawback of introducing fetch gaps while also avoiding additional latency caused by speculation in the recovery of errors.

BRIEF SUMMARY

An embodiment is a computer implemented method for performing recovery. The method includes receiving a notification that a memory channel has failed, the memory channel one of a plurality of memory channels in a memory system. New operations are blocked from starting on the memory channels in response to the notification, and any pending operations on the memory channels are completed in response to the notification. A recovery operation is performed on the memory channels in response to the completing. The new operations are started on at least a first subset of the memory channels in response to the recovery operation completing. The memory system capable of operating with the first subset of the memory channels.

BRIEF DESCRIPTION OF THE SEVERAL VIEWS OF THE DRAWINGS

Referring now to the drawings wherein like elements are numbered alike in the several FIGURES:

FIG. 8 depicts a table that summarize the conditions that will cause a tier one, tier two, or tier three decision to made by the interface monitor and the forward progress monitor in accordance with an embodiment.

DETAILED DESCRIPTION

Figure 1:
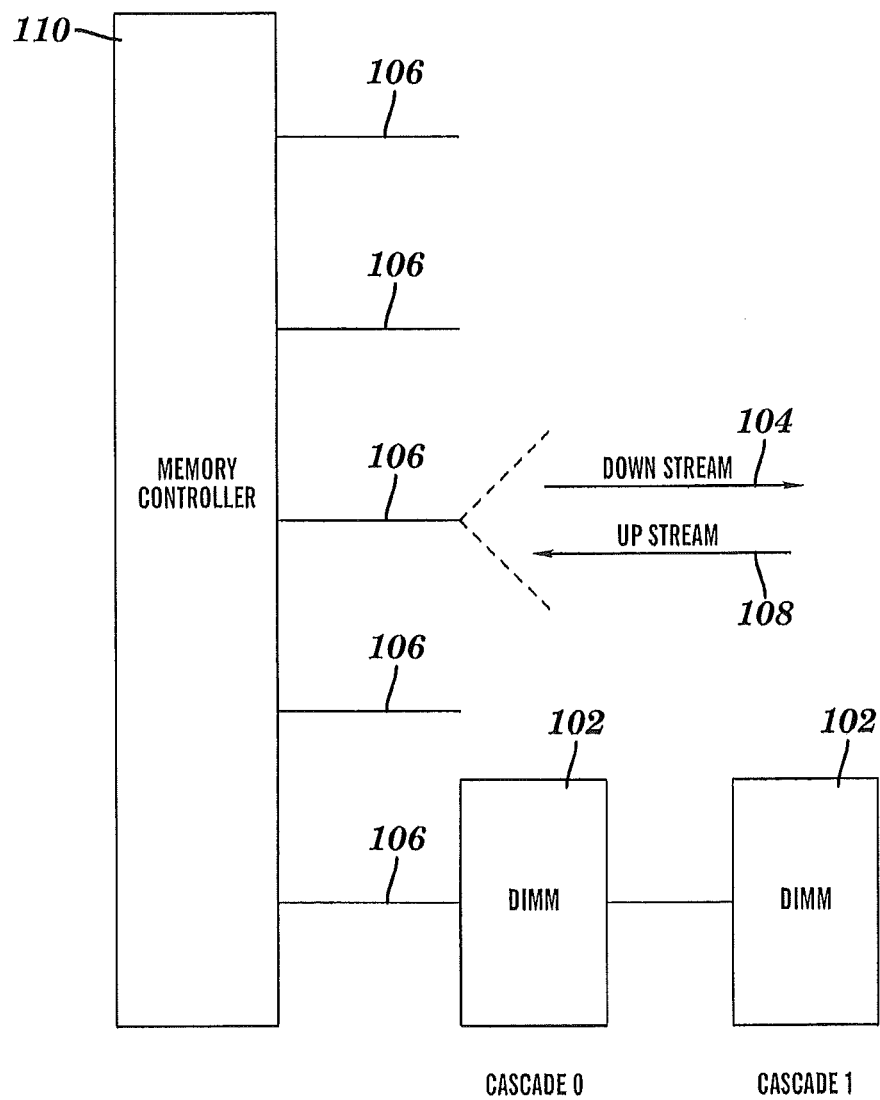
FIG. 1 is a block diagram of a cascaded interconnect memory system that may be implemented by an embodiment.

An embodiment of the present invention provides a memory redundant array of independent memory (RAIM) tiered error correction code (ECC)/cyclical redundancy code (CRC) homogeneous recovery system. An embodiment of a first tier of recovery includes a five channel reset followed by an operation retry. An embodiment of a second tier of recovery includes data recalibration with lane repair, reset, and then an operation retry. An embodiment of a third tier of recovery includes clock recalibration with lane repair, data recalibration with lane repair, reset, and then an operation retry. If a channel cannot be recovered, then a channel checkstop is performed to permanently degrade the channel that cannot be recovered.

An embodiment of the first tier of recovery, referred to herein as a "tier one recovery process" allows for gapless fetches by using a unique guard feature. This tier also allows for fast reset of all five channels while keeping dynamic random access memories (DRAMs) in a self-timed refresh state to keep from losing data. This tier also allows for the reset of some soft errors in the memory subsystem. Stores are retried to make sure that any questionable stores were redone properly.

An embodiment of the second tier of recovery, referred to herein as a "tier two recovery process" is performed when there are still errors occurring after a tier one recovery process has been performed. In the case where there are still errors occurring after a tier one recovery process attempt, eventually the hardware performs a tier two recovery process. This involves retraining of all five channels for timing calibration as well as an automatic data lane repair for any solid or high frequency of bus lane errors. After the repair of these data lanes, the hardware retries any stores that were outstanding.

An embodiment of the third tier of recovery, referred to herein as a "tier three recovery process" is performed in the case where there is a clock error. This process allows for the recalibration and/or sparing of a clock differential from a primary clock to a secondary clock. Since this tier takes a relatively long time (e.g., about ten milliseconds), this tier is performed as a last resort. An embodiment of the tier three recovery process includes a self-repair of clock channel errors and a clock recalibration.

An embodiment also includes programmable timers and counters to assist with the forward progress and sequences, and that can be used to drive proper behavior of the tier one, two and three recovery processes.

An embodiment also includes programmable hang counters for tier one, tier two, and tier three which allow detection of a channel problem during recovery such that a problem channel that hangs can be taken offline while the remaining channels are allowed to continue to run.

An embodiment of the present invention makes use of a RAIM system with five memory channels with RAIM ECC across the five channels and CRCs within each channel. During normal operation, data are stored into all five channels and data are fetched from all five channels. In an embodiment, CRC is used to check the local channel interfaces between a memory controller and cascaded memory modules.

In an embodiment, there is a fetch channel mark that is used to decode the fetch data with a mark RAIM scheme such as the one described in commonly assigned U.S. patent application Ser. No. 12/822,503, entitled "Error Correction and Detection in a Redundant Memory System" filed on Jun. 24, 2010, which is incorporated by reference herein in its entirety. This mark can be set statically (at boot time), after a degrade, for other recovery events, as well as when there is a CRC error present on the channel. In the case of fetch data, if a CRC error is detected on the fetch (upstream), the CRC error is used to mark the channel, thus allowing better protection/correction of the fetch data.

In an embodiment, store data are stored to all channels. When there is a CRC error present on the channel (either from a data fetch or a data store), an embodiment begins the recovery process described herein.

As used herein, the term "memory channel" refers to a logical entity that is attached to a memory controller and which connects and communicates to registers, memory buffers and memory devices. Thus, for example, in a cascaded memory module configuration a memory channel would comprise the connection means from a memory controller to a first memory module, the connection means from the first memory module to a second memory module, and all intermediate memory buffers, etc. As used herein, the term "channel failure" refers to any event that can result in corrupted data appearing in the interface of a memory controller to the memory channel. This failure could be, for example, in a communication bus (e.g., electrical, and optical) or in a device that is used as an intermediate medium for buffering data to be conveyed from memory devices through a communication bus, such as a memory hub device. The CRC referred to herein is calculated for data retrieved from the memory chips (also referred to herein as memory devices) and checked at the memory controller. In the case that the check does not pass, it is then known that a channel failure has occurred. An exemplary embodiment described herein applies to both the settings in which a memory buffer or hub device that computes the CRC is incorporated physically in a memory module as well as to configurations in which the memory buffer or hub device is incorporated to the system outside of the memory module.

FIG. 1 is a block diagram of a cascade interconnect memory system that may be implemented by an exemplary embodiment. The memory system depicted in FIG. 1 includes multiple independent cascade interconnected memory interface busses 106 that are logically aggregated together to operate in unison to support a single independent access request from a memory controller 110. The servicing of the single independent access request includes data and error detection/correction information distributed or "striped" across the parallel memory interface busses 106 and associated memory devices located on the memory modules 102. An embodiment also includes CRC error detection being performed on data being transferred on the memory interface busses 106 between the memory controller 110 and the memory modules 102.

As shown in the embodiment depicted in FIG. 1, the memory controller 110 attaches to five narrow/high speed point-to-point memory interface busses 106, with each memory interface bus 106 connecting one of five memory controller interface channels to a cascade interconnect memory module 102 (or memory subsystem). In an exemplary embodiment, each memory module 102 includes a hub device (hub is optional) and one or more memory devices. As depicted in FIG. 1, the memory interface busses 106 operate in unison to support an access request from the memory controller 110. In an exemplary embodiment, there may exist a multiplicity of outstanding fetch and store requests to the multiple cascades in the memory subsystem.

Each memory interface bus 106 in the embodiment depicted in FIG. 1 includes an upstream bus 108 and a downstream bus 104. One of the functions provided by the memory modules 102 (e.g., a hub device located on the memory module 102) is a re-drive function to send signals on the upstream bus 108 to the memory controller 110 or on the downstream bus 104 to other memory modules 102. In an exemplary embodiment, up to two memory modules 102 are cascade connected to each memory interface bus 106. In an exemplary embodiment, the memory interface bus 106 is implemented using differential clock and data signals (i.e., each clock and data signal requires two wires). In an exemplary embodiment, the downstream bus 104 includes thirty-two wires to support: one clock signal, thirteen data/command signals (or bits), one spare clock lane, and one spare data/command lane. In this embodiment, each data packet is transferred over the downstream bus 104 in twelve beats and includes eighteen CRC bits. In an exemplary embodiment, the upstream bus 108 includes forty-six wires to support: one clock signal, twenty data/command signals, one spare clock lane, and one spare data/command lane. In this embodiment, each data packet is transferred over the upstream bus 108 in eight beats and includes sixteen CRC bits.

As used herein, the term "RAIM" refers to redundant arrays of independent memory modules (e.g., dual in-line memory modules or "DIMMs). In a RAIM system, if one of the memory channels fails (e.g, a memory module in the channel), the redundancy allows the memory system to use data from one or more of the other memory channels to reconstruct the data stored on the memory module(s) in the failing channel. The reconstruction is also referred to as error correction. As used herein, the terms "RAIM" and "redundant arrays of independent disk" or "RAID" are used interchangeably.

In an exemplary embodiment, the memory system depicted in FIG. 1 is a RAIM memory system and the five channels are lock step channels (i.e., the five memory interface busses 106 are accessed in unison with each other). In an exemplary embodiment, the RAIM system depicted in FIG. 1 is implemented using a RAIM ECC code such as that described in commonly assigned U.S. patent application Ser. No. 12/822,469, entitled "Error Correction and Detection in a Redundant Memory System" filed on Jun. 24, 2010, which is incorporated by reference herein in its entirety. The RAIM ECC in this implementation has the property that one of the channel's data is the bitwise XOR of the other four channel's data. Additional checks are included in order to correct for additional errors.

As used herein, the term "mark" refers to an indication given to an ECC that a particular symbol or set of symbols of a read word are suspected to be faulty. The ECC can then use this information to enhance its error correction properties.

As used herein, the term "correctable error" or "CE" refers to an error that can be corrected while the system is operational, and thus a CE does not cause a system outage. As used herein, the term "uncorrectable error" or "UE" refers to an error that cannot be corrected while the memory system is operational, and thus correction of a UE causes the memory system to be off-line for some period of time while the cause of the UE is being corrected (e.g., by replacing a memory device, by replacing a memory module, recalibrating and interface).

In an embodiment, if there are multiple channel errors, the data will be decoded as a UE and the data must be flagged with a special UE (SPUE) in order for the processor to treat this data as unusable. In an embodiment, if there are transient CRC errors present (e.g. when one channel is marked and another channel has CRC errors), a unique SPUE flag is set to distinguish this 'transient' UE condition from a 'permanent' UE condition. The effect of the transient SPUE is that the processor can retry the fetch and get correctable data once the CRC error is done. The permanent SPUE will indicate that the memory UE will persist and the operating system can be notified that the line or page of data is no longer usable (even if there were additional recovery attempts).

Figure 2:
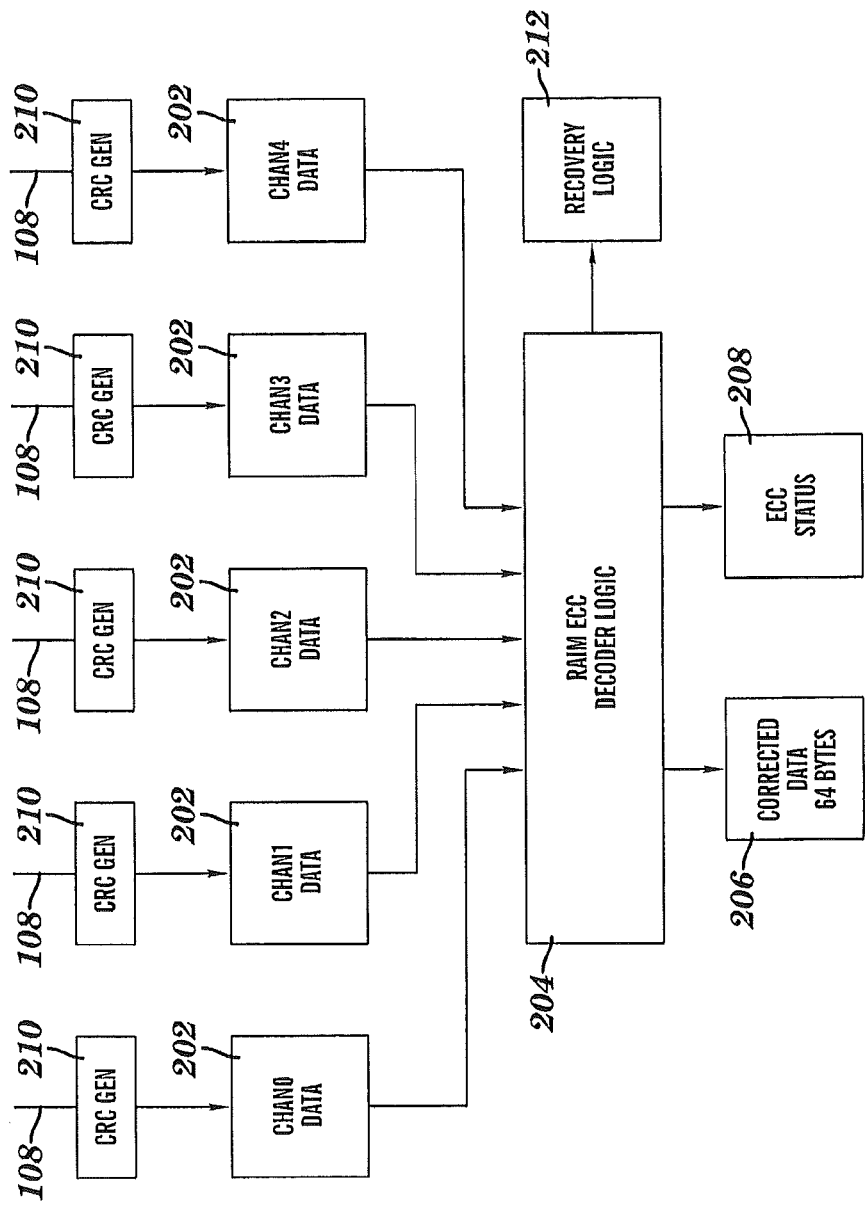
FIG. 2 is a block diagram of a RAIM fetch path that implements both ECC and channel CRC that may be implemented by an embodiment.

FIG. 2 is a block diagram of a RAIM fetch path that implements both ECC and channel CRC that may be implemented by an exemplary embodiment. In an exemplary embodiment, the fetch path is implemented by hardware and/or software located on the memory controller 110. In addition, the fetch path may be implemented by hardware and/or software instructions located on a memory module 102 (e.g., in a hub device on the memory module). As shown in FIG. 2, the RAIM fetch path includes receiving data on the upstream bus 108. In an exemplary embodiment, the data received on the upstream bus 108 is an upstream frame. The CRC checker 210 depicted in FIG. 2 is utilized to detect a channel error, and to temporarily mark a failing channel.

Output from the CRC checkers 210 are the channel data 202 that includes data and ECC bits that were generated by an ECC generator. The channel data 202 are input to RAIM ECC decoder logic 204 where channel data 202 are analyzed for errors which may be detected and corrected using the RAIM ECC and the temporary CRC marking on a failing channel (if a failing channel is detected by any of the CRC checkers 210). Output from the RAIM ECC decoder logic 204 are the corrected data 206 (in this example 64 bytes of corrected data) and an ECC status 208. If CRC errors were detected by CRC checkers 210, then recovery logic 212 is invoked to recover any outstanding stores and to repair any downstream bus 104 and upstream bus 108 lanes. In an exemplary embodiment, the recovery logic 212 performs a retry of stores and/or fetches where errors have been identified. Exemplary embodiments provide the ability to have soft errors (e.g., temporarily incorrect data on good memory devices), hard errors (e.g. permanently damaged memory devices), and also channel failures or other internal errors without getting UEs.

Figure 3:
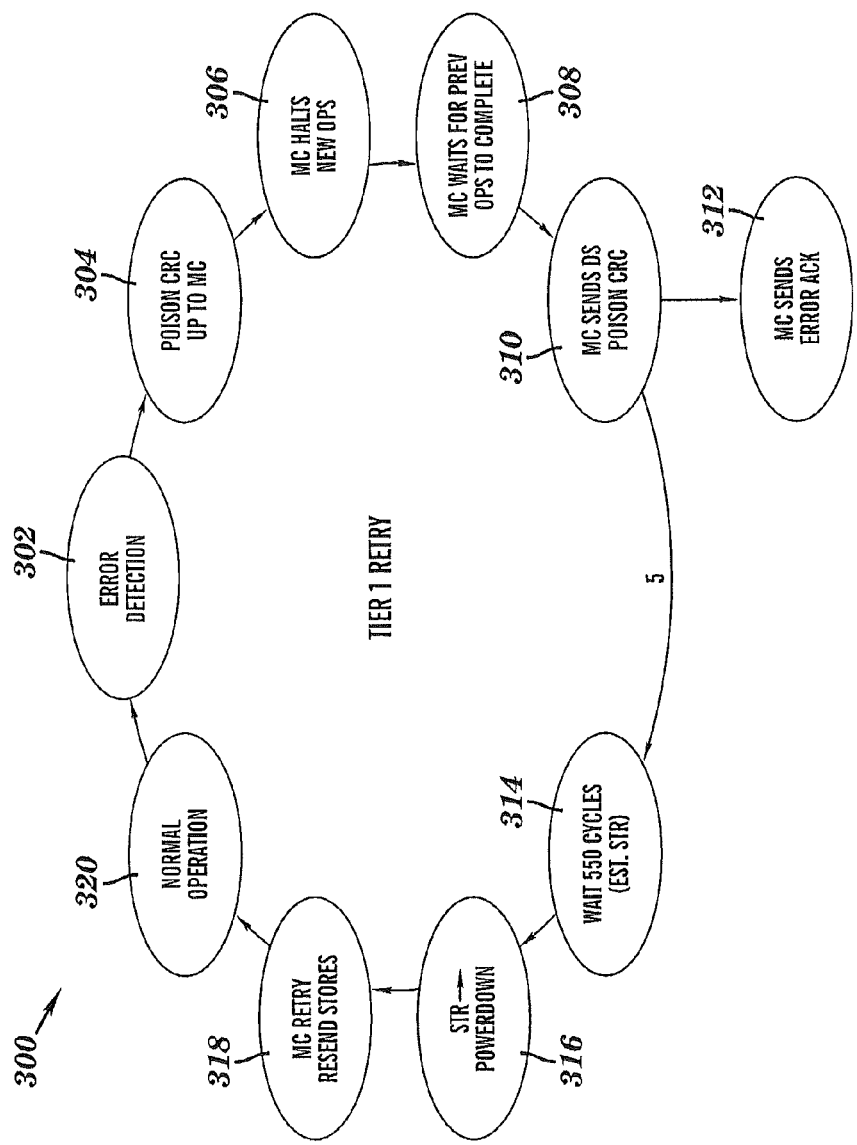
FIG. 3 depicts a tier one recovery process that may be implemented by an embodiment.

FIG. 3 depicts an embodiment of a tier one recovery process 300 that performs a retry and is implemented by the recovery logic 212 depicted in FIG. 2. The tier one recovery process 300 includes a retry and may be implemented by hardware, software and/or firmware. The tier one recovery process 300 is initiated in response to a CRC error being detected 302 (e.g., by a memory module 102 or by the memory controller 110) during a memory fetch or a memory store or an idle period. The memory channel associated with the error is identified and the memory controller 110 is notified 304 via a poison CRC that is sent to the memory controller 110. In response to receiving the poison CRC, the memory controller 110 halts new operations 306. In an embodiment, this includes putting a fence between new stores and fetches that have not started, and pending stores and fetches that are in the middle of being performed (i.e., they are "in-flight" or "in-progress"). This fence keeps new fetches and stores from starting, thus blocking off new operations from starting. Next the memory controller 110 waits for previous operations (e.g., pending stores and fetches) to complete 308. In an embodiment, the channel having the error is shut down and any pending stores or fetches to memory devices in the failing channel are ignored, and only pending operations to the other four memory channels are completed. Because the four non-failing channels are allowed to run, particularly for pending fetches, the RAIM ECC and decoder logic 204 is able to correct any missing fetch data from the failing channel and provide gapless fetch data back to the system from the memory subsystem. Therefore, these steps of halting new operations 306 and waiting for previous operations 308 allows for gapless fetches without retry and without additional latency.

Next, the memory controller 110 sends a downstream poison CRC to all five channels 310. In an embodiment the poison CRC initiates a recovery scheme that helps to clear out channel errors and puts DRAMS (or other memory devices) into a self-timed refresh (STR) state. The memory controller 110 also sends an error acknowledgement 312 and waits about 550 cycles (number of cycles is programmable and is implementation and/or technology specific) 314 that initiates a recovery scheme to exit the error state and prepare channels to be brought back online. Waiting a pre-specified number of cycles allows all of the memory devices to be put into STR.

In an embodiment, sending the error acknowledgement 312 resets buffers and control logic in an attempt to repair soft errors that are present in some of these devices.

Next, the memory devices exit STR and enter a power down state 316 to prepare the channels to be sent a read/write (also referred to herein as a fetches and stores). At this point the memory controller 110 retries stores and any other pending operations 318 that were issued prior to the error. In an embodiment, the fetches are not retried because they were properly corrected through RAIM and don't need to be retried. The fence is removed and the memory devices enter a normal state (or a power down state) 320. In addition, the memory system enters a normal processing state with the new stores and fetches being executed.

An embodiment of the tier one recovery process 300 clears out errors from either soft interface failures or even from soft error upsets (e.g. latches). An embodiment includes logic that can detect latch errors within a channel (e.g. on the memory module buffer device) and force CRC errors in order to allow this recovery process to reset those soft errors.

Some of the above steps in the tier one recovery process 300 may be skipped for some channels. For example, the memory controller 110 may only send a downstream poison CRC and/or an error acknowledgement to the channel where the error was detected in if the overall tier one recovery process time is short enough that refresh is not skipped. For instance, if the next refresh is due in 100 ns but there is a guarantee that a quick, single-channel tier one completes in 50 ns, there may not be a need to put all five channels into self-timed reset state (STR). In an embodiment, the tier one recovery process 300 is performed on all five channels together.

Figure 6:
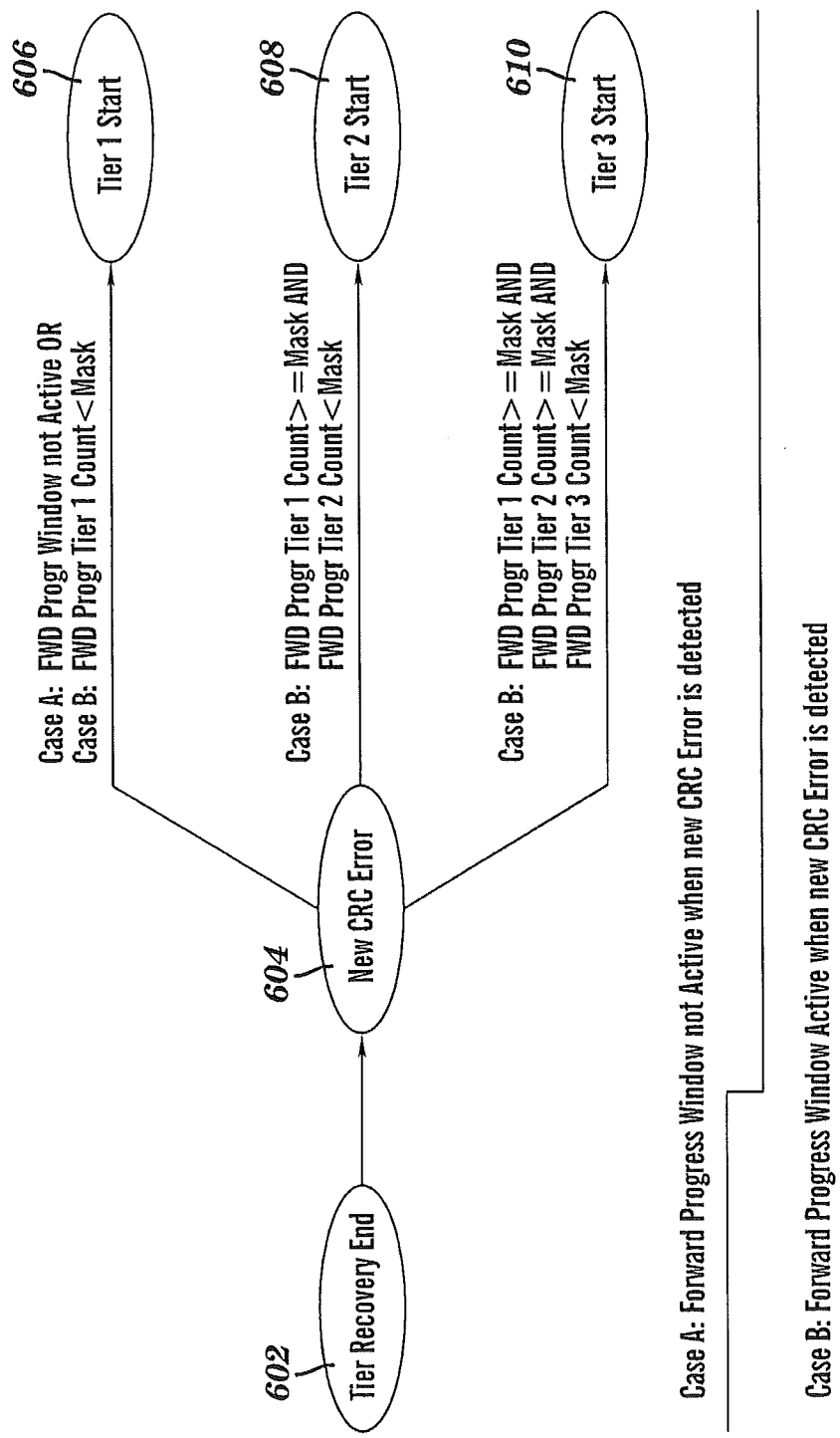
FIG. 6 depicts a forward progress monitor that may be implemented by an embodiment.

If there is a hard data or clock error or even an intermittent error, the tier one recovery process 300 may not be enough to correct the error and the interface may keep failing. There is forward progress logic (programmable) that monitors whether the mainstream logic is getting processed or whether more CRC recovery events are occurring too closely together. FIG. 6, described herein below depicts a process for monitoring forward progress that may be implemented by an embodiment.

Figure 4:
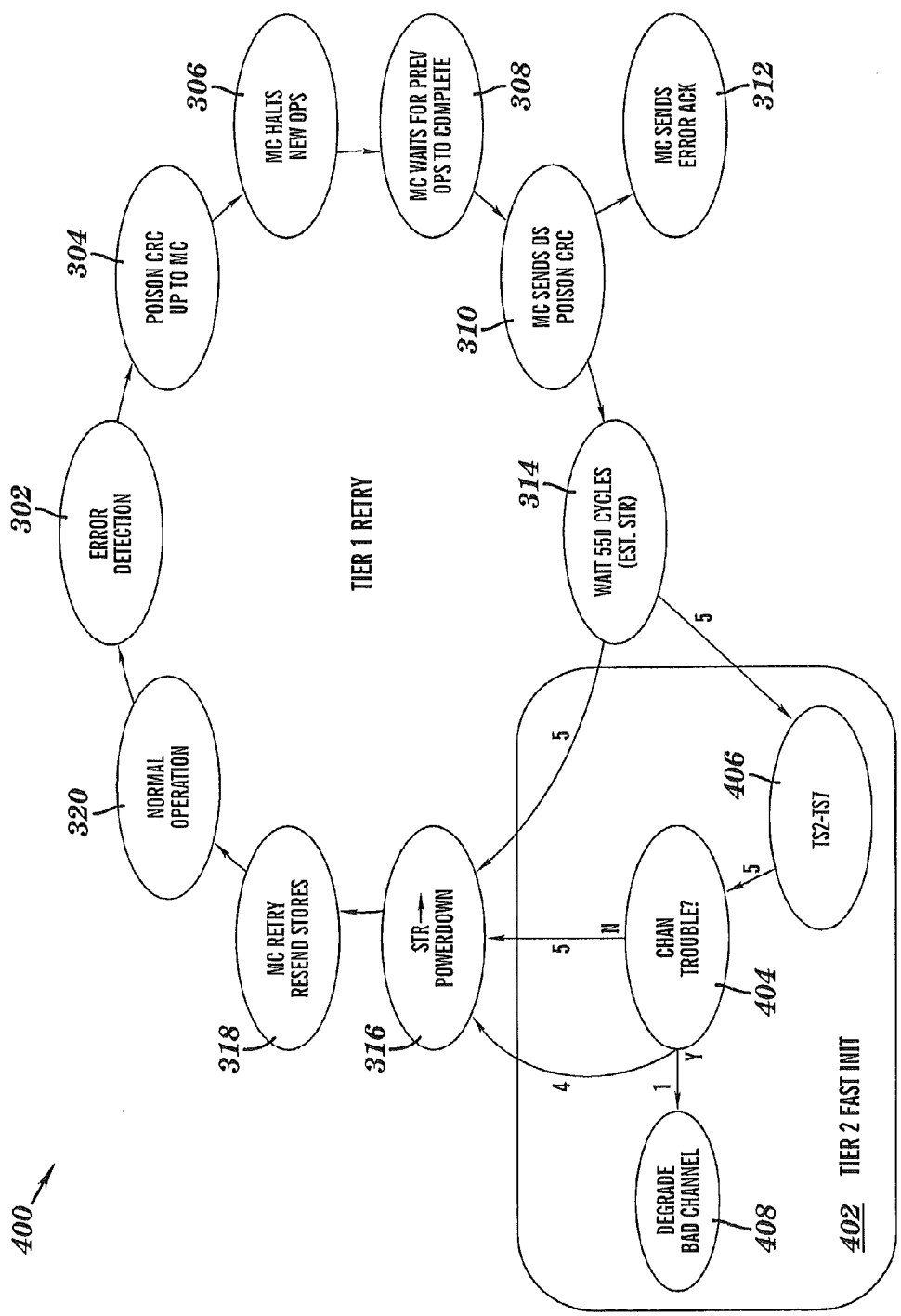
FIG. 4 depicts a tier two recovery process that may be implemented by an embodiment.

When forward progress is not being made, a tier two recovery process 400, such as that depicted in FIG. 4 is required. During the tier two recovery process 400, there is not only a quiesce and reset of the channels, but there is also a data self-heal step that attempts to repair data lanes that are in error by sparing them out to spare bus lanes.

An embodiment of the tier two recovery process 400 includes the tier one recovery process 300 with some additional processing 402. An embodiment of the tier two recovery process 400 runs through the same steps as the tier one recovery process 300 described previously through waiting 550 cycles 314. After waiting 550 cycles 314, the tier two recovery process 400 performs a tier two fast initiation 406. These steps can also be referred to as training state two (TS2) through training state seven (TS7). During these steps all of the lanes in all of the channels are retrained and checked, and any problem lanes that are detected after training are repaired (e.g., using spare lanes). This is a self-heal procedure for data that will calibrate data downstream and upstream across the channels (e.g., across the cascaded DIMMs and memory controller 110). When completed, any solid or high frequency data failures that can be repaired will be self-repaired. In another embodiment, only those lanes in the failing channel are retrained and checked while the other channels are idle. In an embodiment, the step of sending error acknowledgement 312 is skipped when running a tier two fast initiation (TS2-TS7) 406. Processing then continues by determining if there is still a problem with a channel 404. This could be caused by a variety of reasons, such as, but not limited to, having more lanes fail than are available as spare lanes.

If there is still a problem with a channel, then the bad channel is degraded 408. In an embodiment, the memory controller 110 is notified of the failing channel. The other four channels then continue with exiting STR and entering power down 316. If all of the channels are working properly, then all five of the channels exit STR and enter power down 316, followed by the memory controller 110 retrying stores and any other pending operations 318 that were issued prior to the error. In an embodiment, the fetches are not retried because they were properly corrected through RAIM and don't need to be retried. The fence is removed and the memory devices enter a normal state (or a power down state) 320. In addition, the memory system enters a normal processing state with the new stores and fetches being executed. In an embodiment, none, all or portions of the tier two recovery process may be repeated (programmable).

Figure 5:
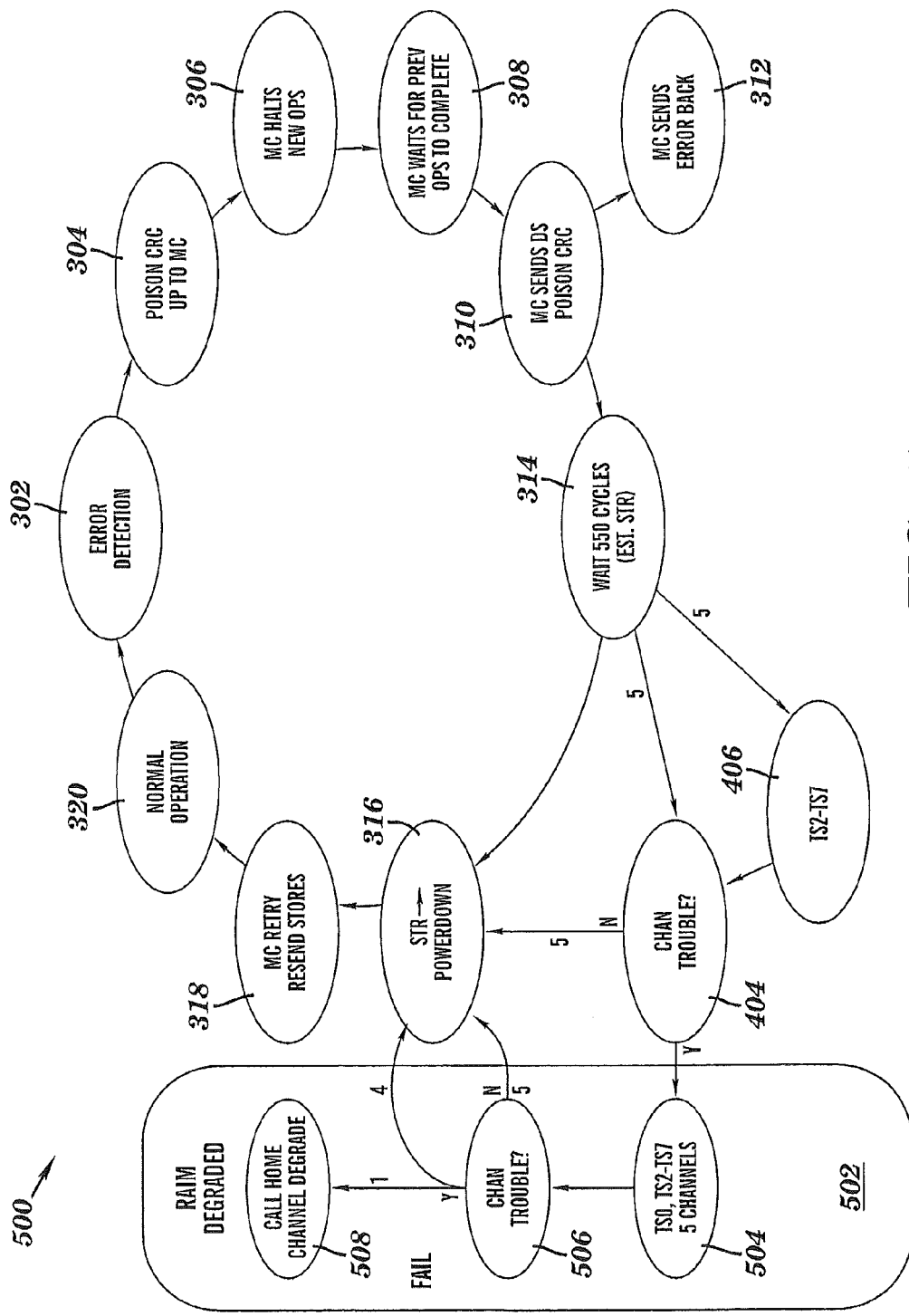
FIG. 5 depicts a tier three recovery process that may be implemented by an embodiment.

If the hardware continues to detect problems with forward progress, it will invoke the tier three recovery process 500 such as that depicted in FIG. 5. During, the tier three recovery process 500 clock initialization is performed on all five channels. In another embodiment, clock initialization is performed on only the failing channel while the other channels remain idle.

An embodiment of the tier three recovery process 500 includes the tier two recovery process 400 with some additional processing 502. The additional processing includes clock initialization 504 (also referred to as executing TS0 followed by TS2-TS7). Processing then continues by determining if there is still a problem with a channel 506. If there is not a problem, then processing continues with all five of the channels exiting STR and entering power down 316. At this point the memory controller 110 retries stores and any other pending operations 318 that were issued prior to the error. In an embodiment, the fetches are not retried because they were properly corrected through RAIM and don't need to be retried. The fence is removed and the memory devices enter a normal state (or a power down state) 320. In addition, the memory system enters a normal processing state with the new stores and fetches being executed.

When the tier three recovery processing 500 is complete, then all channels should be clean. The clocks and/or data will have been recalibrated and/or repaired as necessary. Since all channels were halted from performing stores and fetches during the tier one recovery processing 300, tier two recovery processing 400 and tier three recovery processing 500, and retries were issued on any outstanding stores that might have failed, the data in the channels should be clean and ready for use.

If there is still a problem with a channel, then four of the channels proceed to exiting STR and enter power down 316 and an error report is generated 508 about the fifth channel. Because of the redundancy described previously herein, the memory system will continue to operate in the presence of the failing channel. In an embodiment, a mark is put on the bad channel and fetches ignore that channel. This is considered a RAIM degrade mode because full channel failures on top of the marked channel cannot be corrected. In an embodiment stores are also blocked from this channel to save power.

Figure 7:
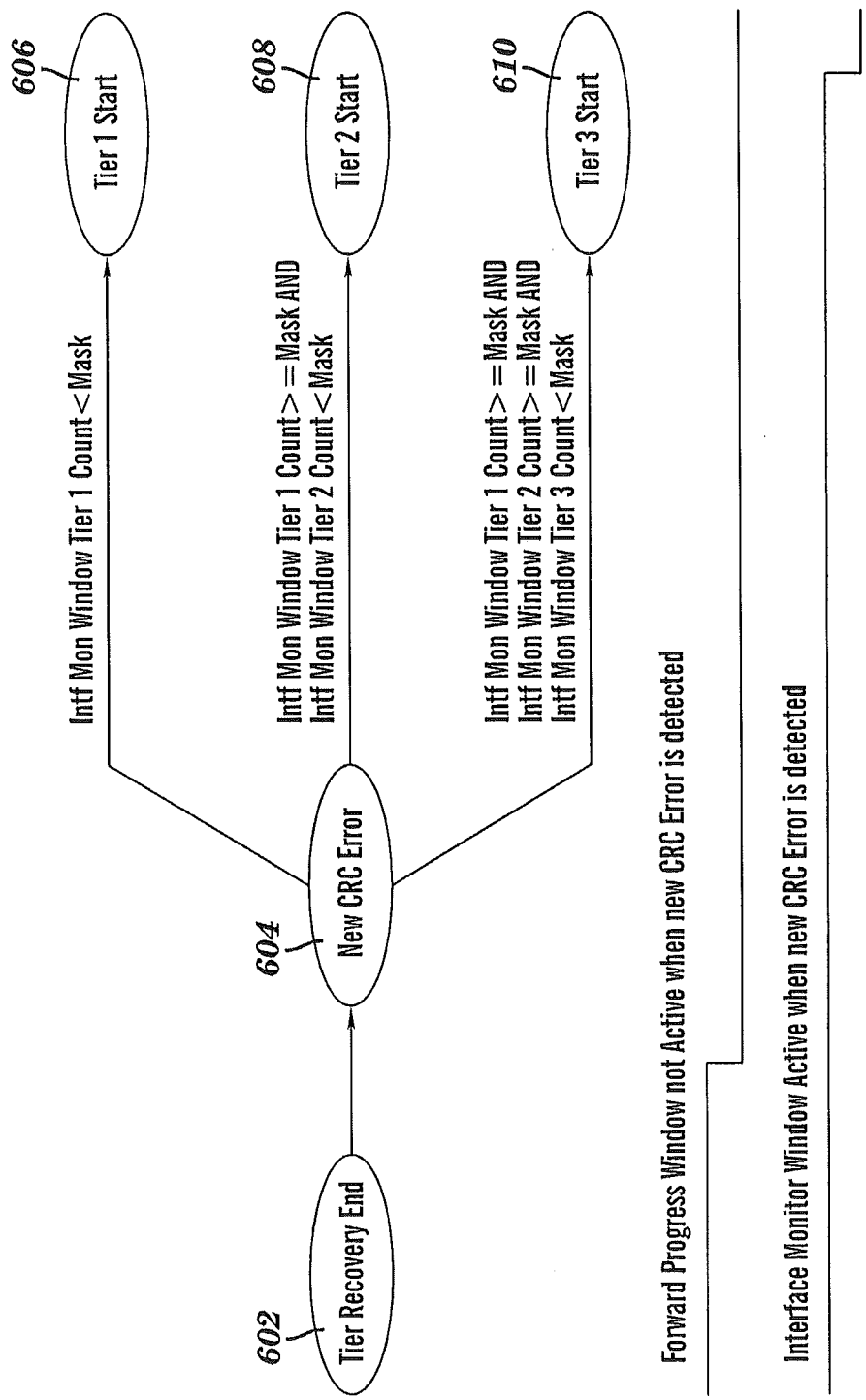
FIG. 7 depicts an embodiment of an interface monitor.

Turning to FIGS. 6-7, processes for monitoring forward progress according to an embodiment are depicted. In an embodiment, a decision about which recovery is to be used at any given moment is based on the history of the past recoveries.

An embodiment of a forward progress window (also referred to herein as a "forward progress monitor"), such as the one depicted in FIG. 6, is designed to ensure that the machine is not constantly looping in recovery if CRC errors are very frequent. The forward progress window opens up at the beginning of each tier recovery and closes some time after the recovery has completed 602. For each tier there is an associated counter (e.g., forward progress tier one, two, and three counts) that counts the number of times the hardware has performed that tier since the forward progress window was open. If a new CRC error 604 is detected during the forward progress window and the forward progress counter is equal or greater than a pre-loaded mask value, the recovery engine escalates to the next tier on the next CRC error 604. This way if tier one 606 did not managed to solve the problem, the recovery engine escalates the recovery to tier two 608 where a fast link training is performed. If tier two 608 does not resolve the interface issues then tier three 610 is performed which takes the channels off-line and calibrates the clocks on that channels.

An embodiment of an interface monitor, such as the one depicted in FIG. 7, is used to monitor for CRC errors in a larger period of time than the forward progress window. In an embodiment, the forward progress window and the interface monitor are running in parallel with each other, in another embodiment they are combined into a single process. If the machine is making forward progress but is detecting CRC errors at a higher than normal rate this could be an indication that the interface may need to be recalibrated. Similar to the forward progress window, the interface monitor has an associated counter for each tier (interface monitor window tier one, two, three count) that counts the number of times the hardware has performed that tier since the window was open. If a new CRC error 604 is detected and interface monitor counter is equal or greater than a pre-loaded mask value, the recovery engine forces the next tier on the next CRC error 604. This way if it detected that tier one 606 did not managed to solve the problem the recovery engine escalates the recovery to tier two 608 where a fast link training is performed. If tier two 608 does not resolve the interface issues then tier three 610 is performed.

In an embodiment, the interface monitor window starts asynchronously of the CRC recovery and is based on a free running counter. The interface monitor window tier (one, two, three) counters are reset at the end of the interface monitor window. In an embodiment, the escalation to the next tier does not get reset until a next CRC error causes the escalated tier to be performed.

FIG. 8 depicts a table that summarize the conditions that will cause a tier one, tier two, or tier three decision to made by the interface monitor and the forward progress window. As shown in the table in FIG. 8, if a particular tier has been performed a required number of times (for whichever reason, whether forward progress or from the interface monitor), the next higher tier will be performed.

Technical effects and benefits include the ability to recover from memory channel failures. This may lead to significant improvements in memory system availability and serviceability.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In exemplary embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

Figure 9:
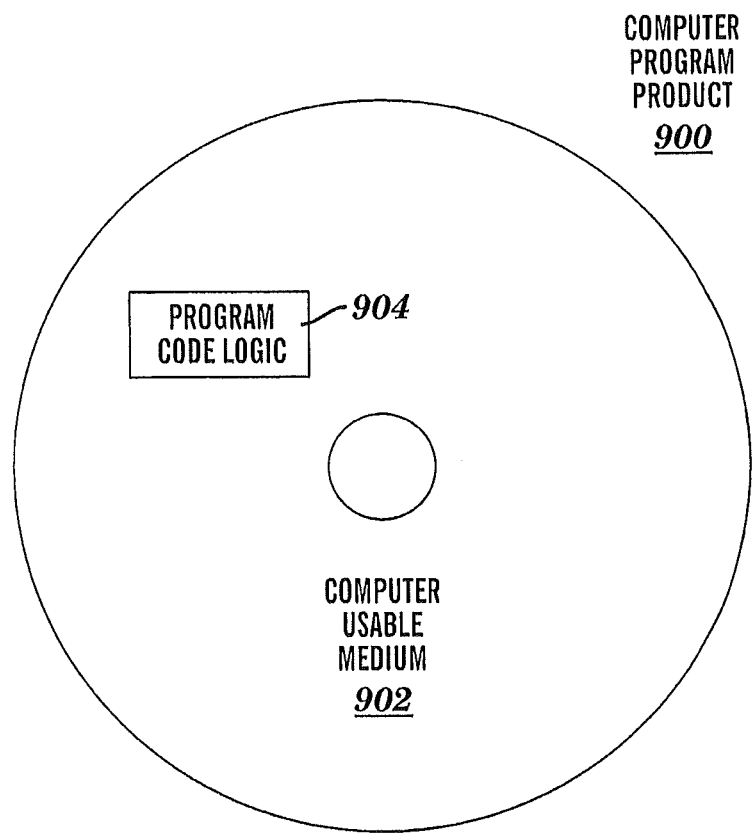
FIG. 9 depicts a computer program product that may be implemented by an exemplary embodiment of the invention.

As described above, embodiments can be embodied in the form of computer-implemented processes and apparatuses for practicing those processes. In exemplary embodiments, the invention is embodied in computer program code executed by one or more network elements. Embodiments include a computer program product 900 as depicted in FIG. 9 on a computer usable medium 902 with computer program code logic 904 containing instructions embodied in tangible media as an article of manufacture. Exemplary articles of manufacture for computer usable medium 902 may include floppy diskettes, CD-ROMs, hard drives, universal serial bus (USB) flash drives, or any other computer-readable storage medium, wherein, when the computer program code logic 904 is loaded into and executed by a computer, the computer becomes an apparatus for practicing the invention. Embodiments include computer program code logic 904, for example, whether stored in a storage medium, loaded into and/or executed by a computer, or transmitted over some transmission medium, such as over electrical wiring or cabling, through fiber optics, or via electromagnetic radiation, wherein, when the computer program code logic 904 is loaded into and executed by a computer, the computer becomes an apparatus for practicing the invention. When implemented on a general-purpose microprocessor, the computer program code logic 904 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for performing recovery, the method comprising:

receiving a notification that a memory channel has failed, the memory channel one of a plurality of memory channels in a memory system;

preventing new operations from starting on the memory channels based on the notification;

shutting down the failing memory channel and ignoring any pending stores and fetches in the failing memory channel;

based on shutting down the failing memory channel, completing any in-progress fetches only on a portion of the memory channels, the portion of the memory channels consisting of non-failing channels;

performing a recovery operation on the memory channels based on the completing of any in-progress fetches, the recovery operation comprising resetting the memory channels and performing data calibration on at least a second subset of the memory channels in the memory system, wherein any other memory channels in the memory system that are not in the second subset are idle during the performing of the data calibration;

retrying any pending stores that were issued prior to receiving notification of the failing memory channel after performing the recovery operation; and allowing the new operations to start on at least a first subset of the memory channels based on completion of the recovery operation, the memory system configured to operate with the first subset of the memory channels.

2. The method of claim 1, wherein there are five memory channels in the memory system, the memory system is capable of operating with any four of the five memory channels, and the first subset includes four of the memory channels.

3. The method of claim 1, further comprising starting the new operations on all of the memory channels in the memory system.

4. The method of claim 1, the recovery operation further comprising performing clock calibration on at least a third subset of the memory channels in the memory system while any other memory channels in the memory system that are not in the third subset are idle.

5. The method of claim 4, the recovery operation further comprising transmitting a failure alert to a memory controller.

6. The method of claim 1, the recovery operation further comprising performing lane repair on the failing memory channel.

* * * * *